United States Patent
Lee et al.

(10) Patent No.: US 7,925,147 B2
(45) Date of Patent: Apr. 12, 2011

(54) MOBILE TERMINAL HAVING CAMERA FLASH AND METHOD FOR CONTROLLING CAMERA FLASH

(75) Inventors: Dong-Woo Lee, Suwon-si (KR); Jin-Ha Kim, Seoul (KR); Oh-Sung Byun, Suwon-si (KR); Young-Jin Cho, Seoul (KR); Moo-Youn Park, Kwangmyung-si (KR); Jun-Won Kim, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 0 days.

(21) Appl. No.: 12/643,573

(22) Filed: Dec. 21, 2009

(65) Prior Publication Data
US 2011/0019991 A1    Jan. 27, 2011

(30) Foreign Application Priority Data
Jul. 24, 2009    (KR) .................. 10-2009-0068001

(51) Int. Cl.
  *G03B 15/02* (2006.01)
  *G03B 15/03* (2006.01)
(52) U.S. Cl. ......................................... 396/61; 396/164

(58) Field of Classification Search ................ 396/61, 396/63, 164, 166; 348/370–371
See application file for complete search history.

(56) References Cited

U.S. PATENT DOCUMENTS
2005/0122420 A1 * 6/2005 Matsui .................. 348/370
* cited by examiner

*Primary Examiner* — W. B. Perkey
*Assistant Examiner* — Minh Q Phan
(74) *Attorney, Agent, or Firm* — McDermott Will & Emery LLP

(57) ABSTRACT

A mobile terminal including an LED camera flash includes a lens, which is for photographing an object, an image sensing unit, which generates a sensor result value by executing automatic exposure and automatic white balance, a flash module, which includes a flash driving unit that controls the LED camera flash, an actuator, which moves the lens and records a distance traveled by the lens, and a camera control module, which sets an exposure gain value by using the sensor result value, extracts a distance current value and a distance gain value by using position information of the lens that is determined by using the distance traveled by the lens, and controls the flash driving unit so as to adjust a brightness of the LED camera flash according to a gain correction value, which is set by using the exposure gain value, the distance current value and the distance gain value.

14 Claims, 8 Drawing Sheets

FIG. 7

| | | | | | |
|---|---|---|---|---|---|
| Distance information regarding distance to object | ~ 0.3 | ~ 0.7 | ~ 1.0 | ... | ~ 2.0 |
| Distance current value | I1 | I2 | I3 | ... | In |
| Distance gain value | G1 | G2 | G3 | ... | Gn |

70

73 — Distance information regarding distance to object
75 — Distance current value
77 — Distance gain value

US 7,925,147 B2

MOBILE TERMINAL HAVING CAMERA FLASH AND METHOD FOR CONTROLLING CAMERA FLASH

CROSS-REFERENCE TO RELATED APPLICATIONS

This application claims the benefit of Korean Patent Application No. 10-2009-0068001, filed with the Korean Intellectual Property Office on Jul. 24, 2009, the disclosure of which is incorporated herein by reference in its entirety.

BACKGROUND

1. Technical Field

The present invention relates to a camera flash, more specifically to a mobile terminal having a camera flash and a method for controlling the camera flash.

2. Description of the Related Art

A camera module being mounted on a mobile terminal such as a mobile communication terminal and a laptop computer is often equipped with a flash to provide sufficient light required for photographing at night.

Commonly used as the flash is a xenon lamp, which has spectral properties close to the solar spectrum and has high instant brightness. A flash using the xenon lamp, however, is not suitable for a slow shutter photography or a video recording due to its short light-emitting time, and the property of the spectrum results in an unnatural image when photographing at dawn or at night for the purpose of compensating the backlight.

A high brightness LED has complemented the insufficient brightness and inefficient heat dissipation properties of the conventional LED and has some advantages such as the smaller size and longer product life. The high brightness LED is applied in a camera module of a mobile terminal, such as a mobile communication terminal and a laptop computer, as a flash for photographing various images, such as video images and still images.

The LED flash, however, has excessive variance in the brightness, property of electric current and distribution of color temperature property for each product depending on the properties of the fabricated LED chip and package, and there are severe attribute changes during the operation, depending on the thermal measure taken for the package. Particularly, such attribute change becomes a more serious problem for high brightness LED products.

SUMMARY

The present invention provides a mobile terminal having a camera flash and a method for controlling the camera flash that can control the brightness of an LED flash.

The present invention also provides a mobile terminal having a camera flash and a method for controlling the camera flash that can control the brightness of an LED flash regardless of the dispersion of the LED's light and the brightness of its surroundings.

An aspect of the present invention provides a mobile terminal that includes an LED flash for a camera.

In accordance with an embodiment of the present invention, a mobile terminal including an LED camera flash includes a lens, which is for photographing an object, an image sensing unit, which generates a sensor result value by executing automatic exposure and automatic white balance, a flash module, which includes a flash driving unit that controls the LED camera flash, an actuator, which moves the lens and records a distance traveled by the lens, and a camera control module, which sets an exposure gain value by using the sensor result value, extracts a distance current value and a distance gain value by using position information of the lens that is determined by using the distance traveled by the lens, and controls the flash driving unit so as to adjust a brightness of the LED camera flash according to a gain correction value, which is set by using the exposure gain value, the distance current value and the distance gain value.

The camera control module further includes an LED deviation managing unit, which determines deviation information of an LED used in the LED camera flash and extracts an LED deviation value that is matched with the deviation information from a predetermined LED deviation table, and a correction value setting unit, which sets the gain correction value by using the exposure gain value, the distance current value, the distance gain value and the LED deviation value.

Also, the camera control module further includes a computing unit, which generates surrounding brightness information by removing the intensity of light of the LED from the sensor result value and sets the exposure gain value by using the surrounding brightness information, and an extracting unit, which sets distance information regarding a distance to the object by using the position information of the lens and extracts from a predetermined LED driving table the distance current value and the distance gain value that are matched with the distance information regarding the distance to the object.

Here, the extracting unit is configured to set a lens movement table, in which the position information of the lens is matched with the distance information regarding the distance to the object, and extract from the lens movement table and set the distance information regarding the distance to the object matched with the position information of the lens.

Then, the camera control module is configured to generate a brightness information table by matching surrounding brightness information to the sensor result value and extract from the brightness information table and set the surrounding brightness information matched to the sensor result value.

Meanwhile, the camera control module further includes a driving control unit, which sets a driving current value by using the gain correction value and controls and drives the flash driving unit by using the driving current value.

Also, the camera control module includes a focus managing unit, which adjusts and measures a focus of the lens, controls the actuator so as to move the lens, controls the actuator so as to move the lens to a corresponding position by determining a most optimal position of an image received from the image sensing unit, controls the actuator so as to execute automatic focus, and determines the position information of the lens by using the distance traveled by the lens.

Here, the camera control module further includes a focus managing unit, which controls and moves the lens, extracts a maximum point at which a focus value measured according to the moving of the lens becomes a maximum, controls the actuator so as to move the lens to the maximum point, controls the actuator so as to execute automatic focus and determines the position information of the lens by using the distance traveled by the lens.

Another aspect of the present invention provides a method for controlling a camera flash, in which a mobile terminal including an LED camera flash controls the camera flash.

In accordance with an embodiment of the present invention, a method for controlling a camera flash, in which a mobile terminal including an LED camera flash controls the camera flash, includes generating a sensor result value by executing automatic exposure and automatic white balance, setting an exposure gain value by using the sensor result value, determining position information of a lens by executing automatic focus, extracting a distance current value and a distance gain value by using the position information of the lens, setting a gain correction value by using the exposure gain value, the distance current value and the distance gain value, and adjusting a brightness of the LED camera flash according to the gain correction value.

The setting of a gain correction value further includes determining deviation information of an LED used in the LED camera flash, extracting an LED deviation value matched with the deviation information from a predetermined LED deviation table, and setting a gain correction value by using the exposure gain value, the distance current value, the distance gain value and the LED deviation value.

The method further includes, prior to the setting of a gain correction value, setting the LED deviation table in which the LED deviation information is matched with the LED deviation value.

Meanwhile, the setting of an exposure gain value includes setting surrounding brightness information by removing the intensity of light of the LED from the sensor result value, and setting the exposure gain value by using the surrounding brightness information.

Here, the extracting of a distance current value and a distance gain value includes setting distance information regarding a distance to an object by using the position information of the lens, and extracting from a predetermined LED driving table the distance current value and the distance gain value that are matched to the distance information regarding a distance to the object.

The method further includes, prior to the extracting of a distance current value and a distance gain value, setting the LED driving table in which the distance current value and the distance gain value are matched to the distance information regarding a distance to the object.

Additional aspects and advantages of the present invention will be set forth in part in the description which follows, and in part will be obvious from the description, or may be learned by practice of the invention.

BRIEF DESCRIPTION OF THE DRAWINGS

FIG. 7 shows a table regarding the operation of an LED in accordance with an embodiment of the present invention.

DETAILED DESCRIPTION

Figure 1:
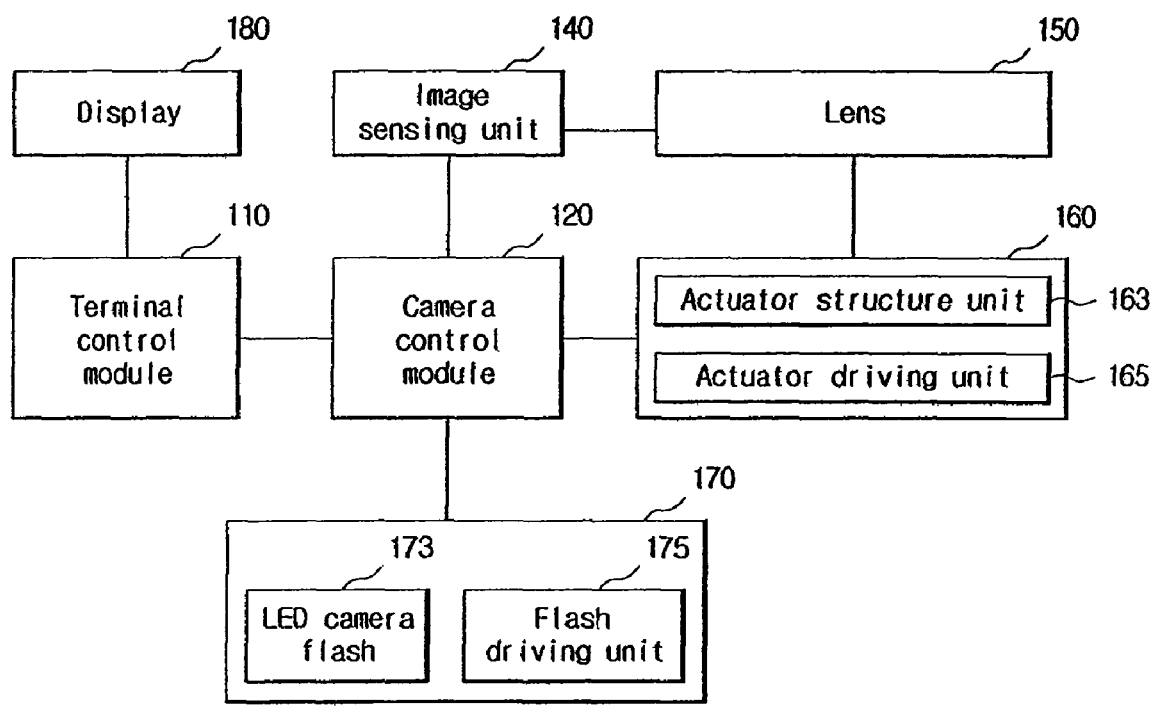
FIG. 1 is a block diagram illustrating the configuration of a mobile terminal having a camera flash in accordance with an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

A mobile terminal having a camera flash and a method for controlling the camera flash according to certain embodiments of the present invention will be described below in more detail with reference to the accompanying drawings. Those components that are the same or are in correspondence are rendered the same reference numeral regardless of the figure number, and redundant descriptions are omitted.

FIG. 1 is a block diagram illustrating the configuration of a mobile terminal having a camera flash according to an embodiment of the present invention.

Referring to FIG. 1, a mobile terminal 10 includes a terminal control module 110, a camera control module 120, an image sensing unit 140, a lens 150, an actuator 160, a flash module 170 and a display 180.

Here, the mobile terminal 10 can be any type of device as long as it is equipped with a camera flash and can record images. The mobile terminal 10 can be, for example, a mobile communication terminal, which can include the functionality of communication, a computer, such as a desktop, a laptop and a netbook, a device for outputting audio, still images and moving images, such as a personal digital assistant (PDA), an MPEG audio layer-3 (MP3) and a portable multimedia player (PMP), and a digital electronic dictionary. Here, the mobile communication terminal can be a device that can include the functionality of communication, for example, a personal digital cellular (PDC), a personal communication service (PCS), a personal handyphone system (PHS), a CDMAΔ2000 (1X, 3X) phone, a WCDMA (wideband CDMA) phone, a dual band/dual mode phone, a global standard for mobile (GSM) phone, a mobile broadband system (MBS) phone, a digital multimedia broadcasting (DMB) phone and a smart phone.

The terminal control module 110 controls the components of the mobile terminal 10. When a user presses a shutter release button, the terminal control module 110 recognizes this and generates a control signal, i.e., a signal to take a photograph. The terminal control module 110 provides the signal to take a photograph to the camera control module 120 so as to start the photographing using the camera. When the shutter release button is pressed by the user, the terminal control module 110 controls the display 180 so as to display a preview image through the display 180. The terminal control module 110 also controls the display 180 in such a way that an image provided by the camera control module 120 is displayed on the display 180.

The camera control module 120 controls the image sensing unit 140, the lens 150, the actuator 160 and the flash module 170 so as to take a photograph of an object through the lens 150. When the signal to take a photograph is received from the terminal control module 110, the camera control module 120 provides a preset LED photographing current value to the flash module 170 during a photographing operation.

The camera control module 120 sets a gain correction value by using an exposure gain value, a distance current value and a distance gain value. The camera control module 120 sets a driving current value by using the gain correction value and also adjusts the brightness of an LED camera flash 173 by controlling the flash module 170 by use of the driving current value. The camera control module 120 will be described in more detail with reference to FIG. 2.

The image sensing unit 140 converts an optical signal received from the lens 150 to an image, which is an electric signal. The image sensing unit 140 generates a sensor result value according to the brightness of its surroundings by executing automatic exposure ("AE" hereinafter) and automatic white balance ("AWB" hereinafter). Here, the sensor result value is a gain value that is obtained by executing AE.

The image sensing unit 140, which is a semiconductor component that converts an optical signal to an electric signal, can be implemented by use of a charge coupled device (CCD) image sensor or a complementary metal oxide semiconductor (CMOS) image sensor. Especially, to reduce the overall thickness and size of a camera module for implementing a smaller, multifunctional camera, the CMOS type of image sensor, which is appropriate for using the chip-on-film (COF) method, can be used as the image sensing unit 140.

The lens 150 moves by the control of the actuator 160 in order to take a photograph of an object and provides an optical signal that is generated by taking a photograph of the object to the image sensing unit 140.

The actuator 160 moves the lens 150 and records the distance traveled by the lens 150. For this, the actuator 160 includes an actuator structure unit 163 and an actuator driving unit 165.

The actuator structure unit 163 supports the lens 150 and moves the lens 150 under the control of the actuator driving unit 165. That is, the actuator structure unit 163 can move the lens 150 according to an electric value applied by the actuator driving unit 165.

The actuator driving unit 165 controls the actuator structure unit 163. Specifically, the actuator driving unit 165 controls the actuator structure unit 163 to move the lens 150 by applying an electric value, which is provided from the camera control module 120, to the actuator structure unit 163. The actuator driving unit 165 records the distance traveled by the lens 150.

The flash module 170 includes an LED camera flash 173 and a flash driving unit 175.

The LED camera flash 173 allows an object to be photographed by generating light if the surrounding of the object is not bright enough when the object is photographed. The LED camera flash 173 generates light by adjusting, under the control of the flash driving unit 175, the brightness according to the brightness of the surrounding of the object and the distance to the object.

The flash driving unit 175 adjusts the brightness of the LED camera flash 173. The flash driving unit 175 operates the LED camera flash 173 by using the LED photographing current value received from the camera control module 120 when the shutter release button is pressed by the user. The flash driving unit 175 operates the LED camera flash 173 by using the driving current value received from the camera control module 120 in order to adjust the brightness according to the brightness of the surrounding of the object and the distance to the object.

The display 180 displays an image that is photographed through the lens 150 by the control of the terminal control module 110 and then converted by the image sensing unit 140.

Figure 2:
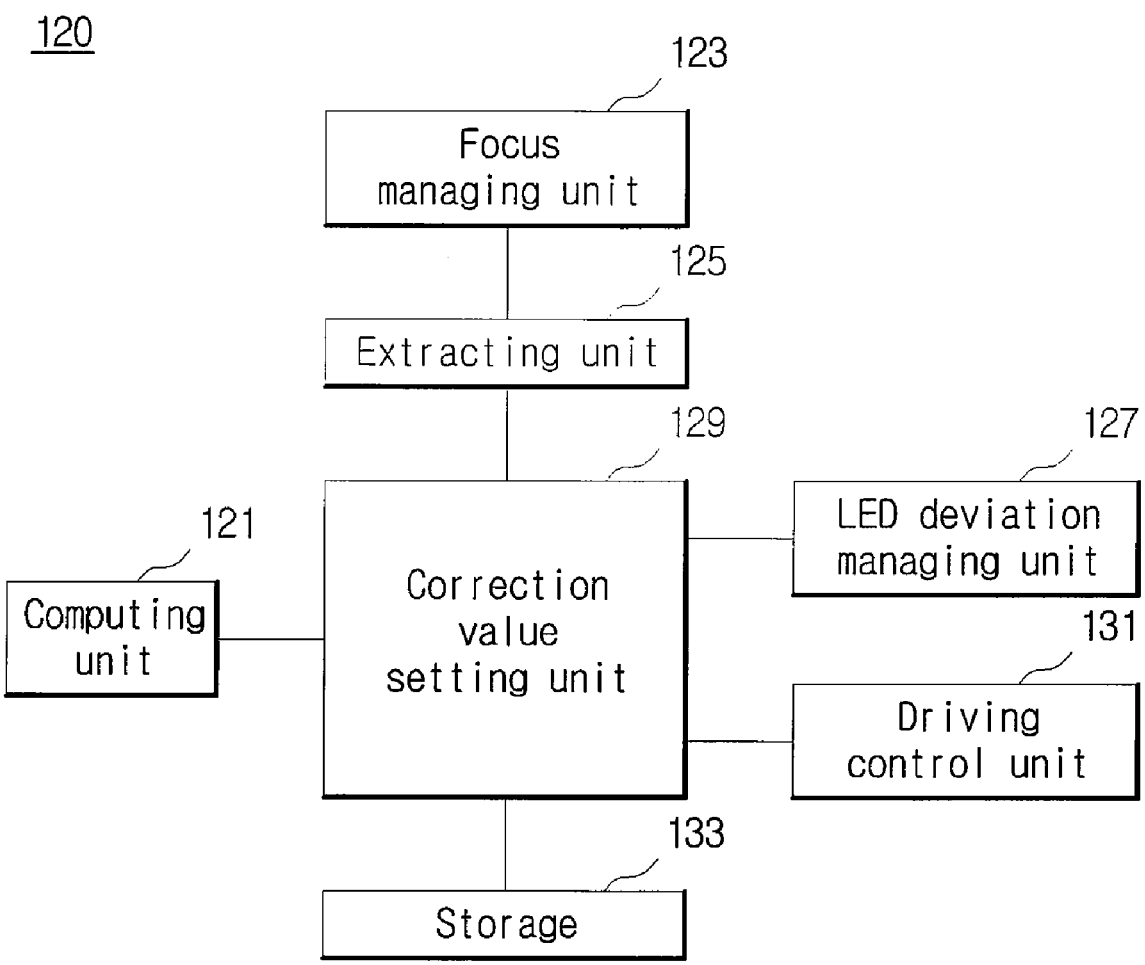
FIG. 2 is a block diagram illustrating details of a camera control module of the mobile terminal shown in FIG. 1.

FIG. 2 is a block diagram illustrating details of the camera control module of the mobile terminal shown in FIG. 1.

Referring to FIG. 2, the camera control module 120 of the mobile terminal 10 includes a computing unit 121, a focus managing unit 123, an extracting unit 125, an LED deviation managing unit 127, a correction value setting unit 129, a driving control unit 131 and a storage 133.

The computing unit 121 generates surrounding brightness information by using the sensor result value received from the image sensing unit 140. That is, since the sensor result value is generated by using the brightness of the surrounding and the amount of LED light, the computing unit 121 can generate the surrounding brightness information by removing the amount of LED light from the sensor result value. Then, the computing unit 121 sets the exposure gain value by computing through the use of the surrounding brightness information. Here, the exposure gain value refers to a gain value that is to be corrected according to the exposure.

Meanwhile, the computing unit 121 can generate a brightness information table by matching the surrounding brightness information to the sensor result value. The computing unit 121 can extract the surrounding brightness information that is matched to the sensor result value, from the brightness information table.

The focus managing unit 123 controls the actuator 160 to adjust the focus. That is, the focus managing unit 123 provides an electric value to the actuator driving unit 165 of the actuator 160 in order to control the lens 150 to move. Then, the focus managing unit 123 provides an electric value to the actuator driving unit 165 so as to move the lens 150 to a corresponding location by determining the most optimized location of an image received from the image sensing unit 140. Here, the actuator structure unit 163 moves the lens by the electric value applied by the actuator driving unit 165.

Meanwhile, the focus managing unit 123 extracts a maximum point at which a focus value measured according to the moving of the lens 150 becomes a maximum and controls the actuator driving unit 165 so as to move the lens 150 to the maximum point. In one example, the focus managing unit 123 controls the actuator driving unit 165 so as to move the lens 150 successively from a direction farther from the image sensing unit 140 to match its focus to an object close to an initial location. Here, the initial location is the nearest location to the image sensing unit 140 and focused on infinite distance. The focus managing unit 123 extracts a maximum point where a focus value that is measured according to the sequential moving of the lens 150 becomes a maximum. The actuator driving unit 165 can control the actuator driving unit 165 so as to move the lens 150 to the maximum point.

The focus managing unit 123 executes automatic focus ("AF" hereinafter). The focus managing unit 123 determines the position information of the lens 150 by using the distance traveled by the lens 150 that is recorded in the actuator driving unit 165.

The extracting unit 125 sets an LED driving table in which the distance current value and the distance gain value are matched to the distance information regarding a distance to the object. Here, the distance current value refers to a current value that is to be corrected according to the distance, and the distance gain value refers to a gain value that is to be corrected according to the distance.

The extracting unit 125 sets distance information regarding the distance to the object by using the position information of the lens 150 provided from the focus managing unit 123. Specifically, the extracting unit 125 sets a lens movement table in which the position information of the lens 150 is matched with the distance information of the object. The extracting unit 125 extracts and executes distance information regarding a distance to the object from the lens movement table, in which the distance information is matched with the position information of the lens 150 provided from the focus managing unit 123. The extracting unit 125 extracts a distance current value and a distance gain value that are matched by the distance information regarding the distance to the object from the lens movement table.

The LED deviation managing unit 127 sets an LED deviation table in which deviation information corresponding to the LED is matched with an LED deviation value. The LED deviation managing unit 127 determines the deviation information of the LED used in the LED camera flash 173 and extracts an LED deviation value that is matched with the deviation information of the LED from the LED deviation table.

The correction value setting unit 129 sets a basic driving condition by using the distance current value and the distance gain value. Here, the basic driving condition corresponds to a driving condition when the surrounding brightness of a basic LED is zero. The correction value setting unit 129 sets the gain correction value by using the distance current value, the distance gain value, the LED deviation value and the exposure gain value.

The driving control unit 131 sets the driving current value by using the gain correction value in order to control the flash driving unit 175. The driving control unit 131 controls the flash driving unit 175 so as to drive the flash driving unit 175 by using the driving current value. Here, the flash driving unit 175 can control the LED camera flash 173 by using the driving current value.

The storage 133 stores data required for photographing an object and data generated for photographing the object. In other words, the storage 133 can store the exposure gain value, which is set by the computing unit 121, and the distance current value and the distance gain value, which are extracted by the extracting unit 125. The storage 133 can store the lens movement table, which is set by the extracting unit 125, and the LED deviation table, which is set by the LED deviation managing unit 127.

Furthermore, the storage 133 provides data required according to requests of the computing unit 121, the extracting unit 125, the LED deviation managing unit 127, the correction value setting unit 129 and the driving control unit 131. In one example, the storage 133 can be constituted by a read only memory (ROM), random access memory (RAM), flash memory and the like.

Figure 3:
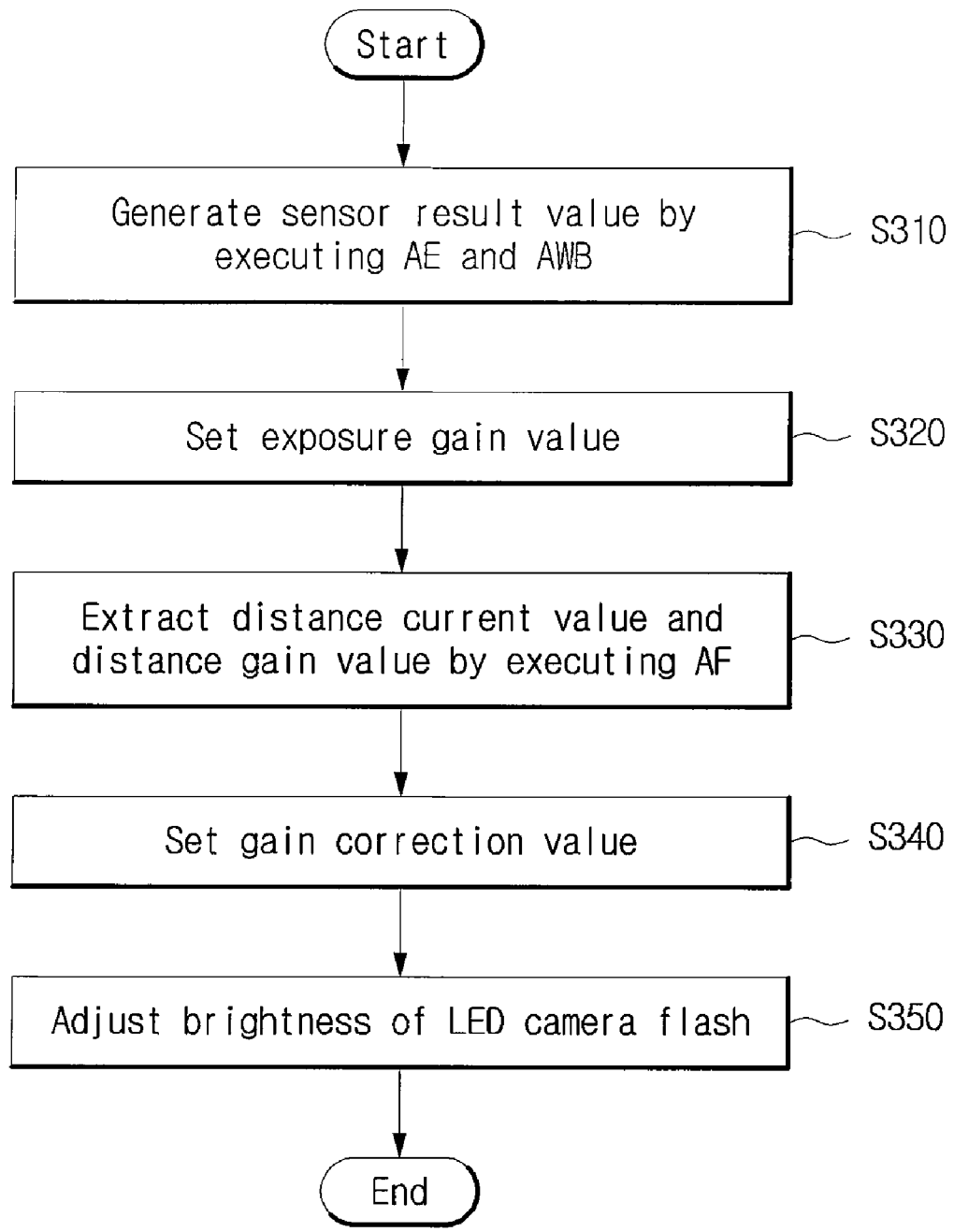
FIG. 3 is a flowchart briefly illustrating a method of controlling a camera flash in accordance with an embodiment of the present invention.

FIG. 3 is a flowchart briefly illustrating a method of controlling a camera flash in accordance with an embodiment of the present invention.

Referring to FIG. 3, the mobile terminal 10 generates a sensor result value by executing AE and AWB (S310). That is, the image sensing unit 140 of the mobile terminal 10 executes AE and AWB under the control of the camera control module 120 and generates the sensor result value according to the brightness of the surrounding of the object.

The camera control module 120 of the mobile terminal 10 sets the exposure gain value by using the sensor result value provided by the image sensing unit 140 (S320).

The camera control module 120 of the mobile terminal 10 extracts the distance current value and the distance gain value by executing AF (S330). That is, the camera control module 120 controls the actuator 160 so as to execute AF and determines the position information of the lens 150 by using the distance traveled by the lens 150, which is stored in the actuator. The camera control module 120 extracts the distance current value and the distance gain value by using the position information of the lens 150.

The camera control module 120 of the mobile terminal 10 sets the gain correction value by using the exposure gain value, the distance current value and the distance gain value (S340).

The camera control module 120 of the mobile terminal 10 sets the driving current value by using the gain correction value. Then, the camera control module 120 sets the driving current value so as to adjust the brightness of the LED camera flash 173 and controls the flash driving unit 175 by using the driving current value. Here, the flash driving unit 175 adjusts the brightness of the LED camera flash 173 through the use of the driving current value (S350).

Figure 4:
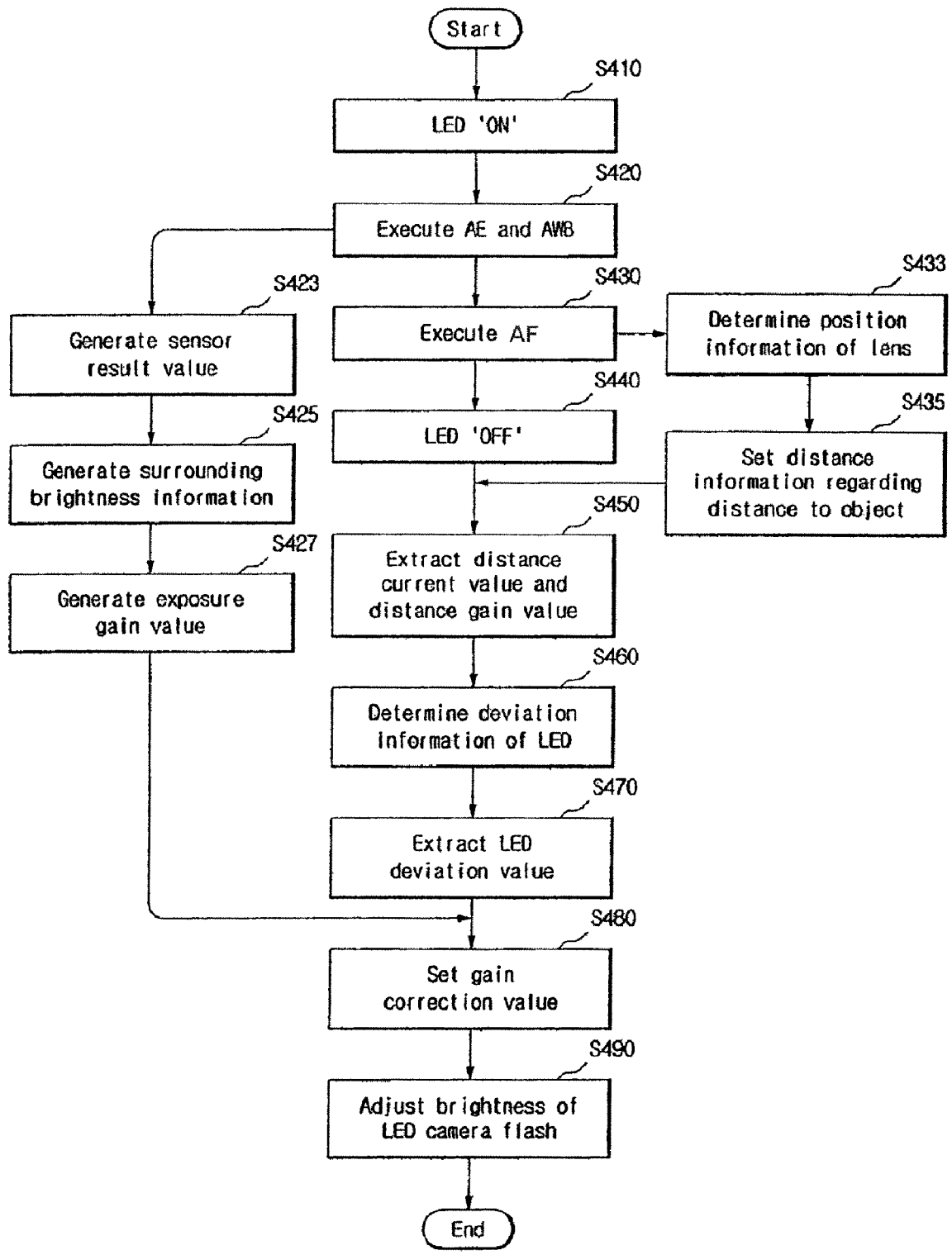
FIG. 4 is a flowchart illustrating details of a method of controlling a camera flash in accordance with an embodiment of the present invention.

FIG. 4 is a flowchart illustrating details of a method of controlling a camera flash in accordance with an embodiment of the present invention.

Referring to FIG. 4, the flash driving unit 175 operates the LED camera flash 173 by turning on the LED of the LED camera flash 173 (S410). Specifically, the flash driving unit 175 allows the LED of the LED camera flash 173 to generate continuous light with low intensity that is determined for executing AF.

The image sensing unit 140 executes AE and AWB while the continuous light is generated (S420). The reason for executing AE and AWB in this way is to obtain brightness and color required for executing AF in an appropriate condition, and the sensor result value generated by executing AE may not be used at the moment of eventual photographing. However, the sensor result value can be used when operating the LED camera flash 173.

The image sensing unit 140 generates a sensor result value according to the brightness of the surrounding of the object by executing AE and AWB (S423). Here, the sensor result value is a gain value that is obtained by executing AE and is generated by using the brightness of the surrounding of the object and the intensity of light of the LED. The image sensing unit 140 provides the generated sensor result value to the camera control module 120.

Figure 5:
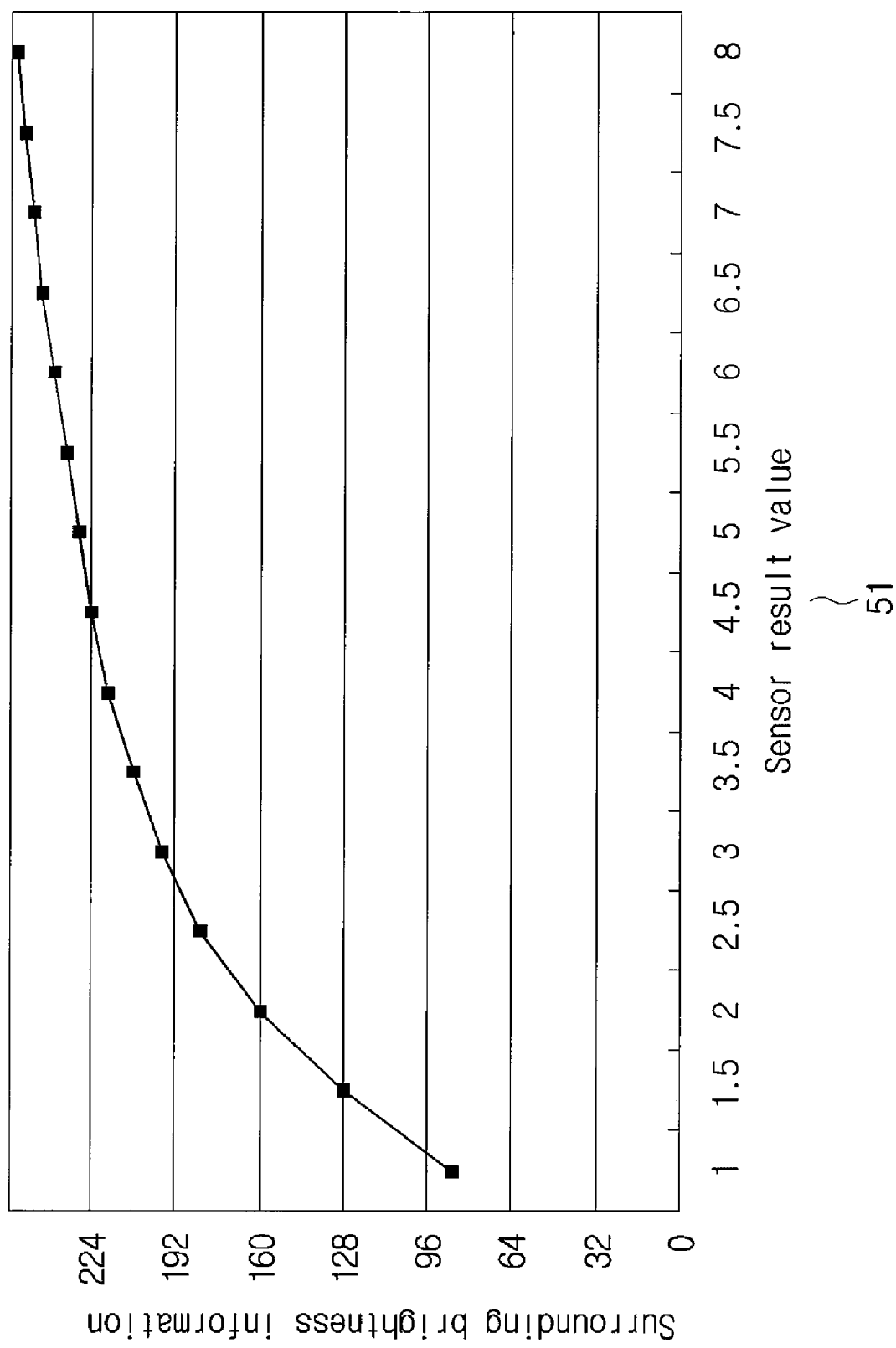
FIG. 5 shows surrounding brightness information according to results of a sensor in accordance with an embodiment of the present invention.

The camera control module 120 generates surrounding brightness information by using the sensor result value (S425). Specifically, the computing unit 121 of the camera control module 120 generates the surrounding brightness information by removing the intensity of light of the LED from the sensor result value. Meanwhile, the computing unit 121 can set the brightness information table by matching the surrounding brightness information to the sensor result value that is generated by the image sensing unit 140. In one example, the computing unit 121 can set the brightness information table by displaying surrounding brightness information 53 as a graph in accordance with sensor result values 51, as shown in FIG. 5. If there is a predetermined brightness information table, the computing unit 121 can extract the surrounding brightness information that is matched with the sensor result value from the brightness information table. In other words, the surrounding brightness information is generated by using the sensor result value. This is because the sensor result value is a main factor that determines the operation of the LED camera flash 173, and if the system is equipped with lighting means, the brightness of the surrounding of the object can be readily calculated from incident light but a typical mobile terminal 10 is not equipped with such lighting means.

The computing unit 121 of the camera control module 120 generates the exposure gain value by using the surrounding brightness information (S427). Here, the exposure gain value refers to a gain value that is to be corrected according to the exposure. Then, the computing unit 121 provides the generated exposure gain value to the correction value setting unit 129.

Meanwhile, the focus managing unit 123 of the camera control module 120 executes AF (S430).

The focus managing unit 123 of the camera control module 120 determines the position information of the lens 150 (S433). Specifically, the focus managing unit 123 controls the actuator driving unit 165 so as to move the lens 150 and determines the most optimal location of an image received from the image sensing unit 140. Then, the focus managing unit 123 controls the actuator driving unit 165 so as to move the lens 150 to a corresponding location by using the most optimal location.

Also, the focus managing unit 123 extracts a maximum point at which a focus value that is measured according to the moving of the lens 150 becomes a maximum and controls the actuator driving unit 165 so as to move the lens 150 to the maximum point. Here, the actuator driving unit 165 moves the lens 150 through the actuator structure unit 163 under the control of the focus managing unit 123 and records the distance traveled by the lens 150. Afterwards, the focus managing unit 123 determines the position information of the lens 150 by using the distance traveled by the lens 150, which is stored in the actuator driving unit 165.

Here, any method other than the above-described method of executing AF may be used as long as the position information of the lens 150 can be determined.

Figure 6:
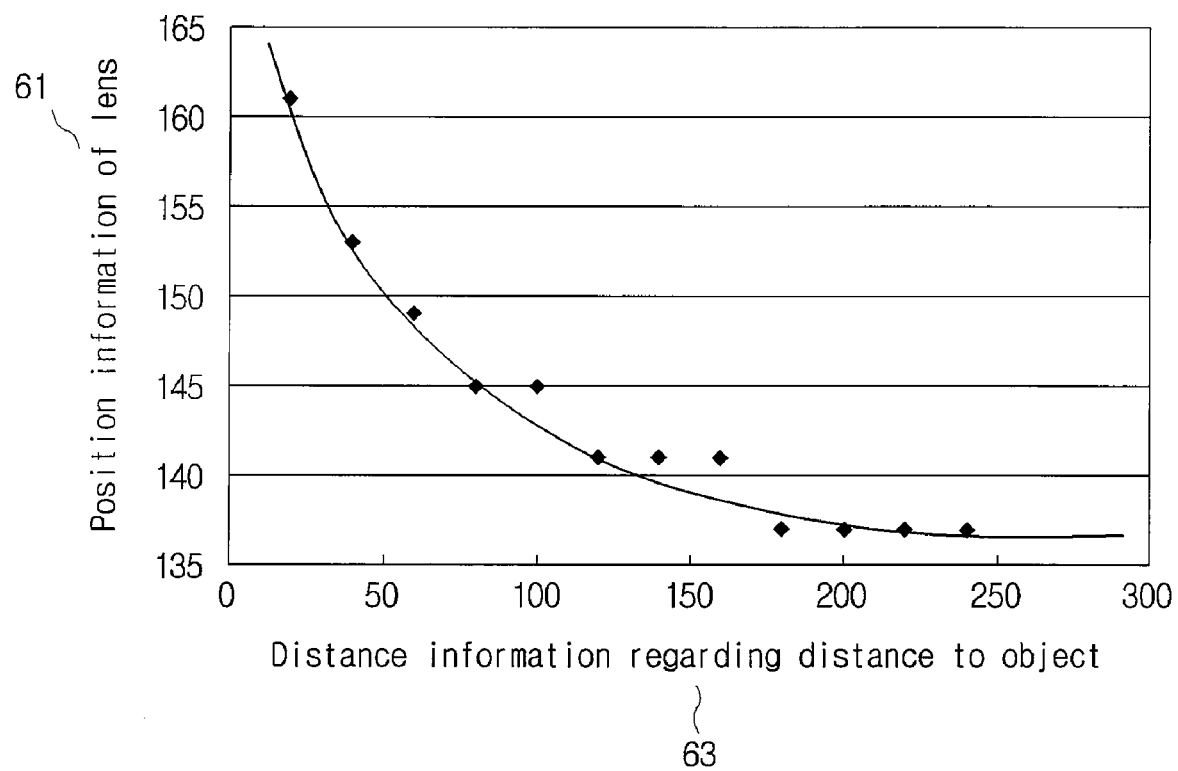
FIG. 6 shows information regarding a distance to an object according to the position information of a lens in accordance with an embodiment of the present invention.

The extracting unit 125 sets the lens movement table in which the position information of the lens 150 is matched with the distance information of the object. In one example, the extracting unit 125 can set the lens movement table by displaying the distance information of the object as a graph in accordance with the position information of the lens 150, as shown in FIG. 6. For the convenience of description, the step of setting of the lens movement table follows the step of determining of the position information of the lens 150, but the step of setting of the lens movement table can be set at the time of setting the mobile terminal 10 initially or updating the mobile terminal 10.

The extracting unit 125 of the camera control module 120 sets the distance information regarding a distance to the object by using the position information of the lens 150 (S435). Specifically, the extracting unit 125 extracts and sets the distance information regarding a distance to the object that is matched with the position information of the lens 150 from the predetermined lens movement table.

The LED camera flash 173 is turned off under the control of the flash driving unit 175 (S440). That is, the LED camera flash 173 does not generate light.

The extracting unit 125 of the camera control module 120 sets the LED driving table in which the distance current value and the distance gain value are matched to the distance information regarding a distance to the object. In one example, the extracting unit 125 sets an LED driving table 70 in which a distance current value 75 (I1) and a distance gain value 77 (G1) are matched to distance information 73 (0.3 m or shorter) regarding a distance to the object, as shown in FIG. 7. To determine the appropriate intensity of light according to the distance information with respect to the object, the current value and gain value of the LED based on the distance can be extracted by taking a test photograph in an environment of which the brightness is low enough not to affect the initial surrounding brightness of the LED that is to be used in the LED camera flash 173.

Also, the proper intensity of light can set by using the gain value of the image sensing unit. While it would be ideal to obtain the proper intensity of light through little use of current to obtain a large amount of light in the LED itself, there are not enough high-performance products that are technically and economically adequate. Therefore, considering this limitation, it is preferable that the gain value and distance current value are adjusted by properly increasing the gain value within the range of not being affected by the noise on the screen at a longer distance, in order to obtain the proper intensity of light that can allow a low-brightness photography by use of the LED camera flash 173 at a longer distance. For the convenience of description, the step of setting the LED driving table precedes the extracting of the distance current value and distance gain value, but it is possible that the step of setting the LED driving table is set at the time of setting the mobile terminal 10 initially or updating the mobile terminal 10.

The camera control module 120 extracts the distance current value and the distance gain value by using the distance information regarding a distance to the object (S450). Specifically, the extracting unit 125 of the camera control module 120 extracts the distance current value and the distance gain value that are matched with the distance information regarding a distance to the object from the predetermined LED driving table.

Figure 8:
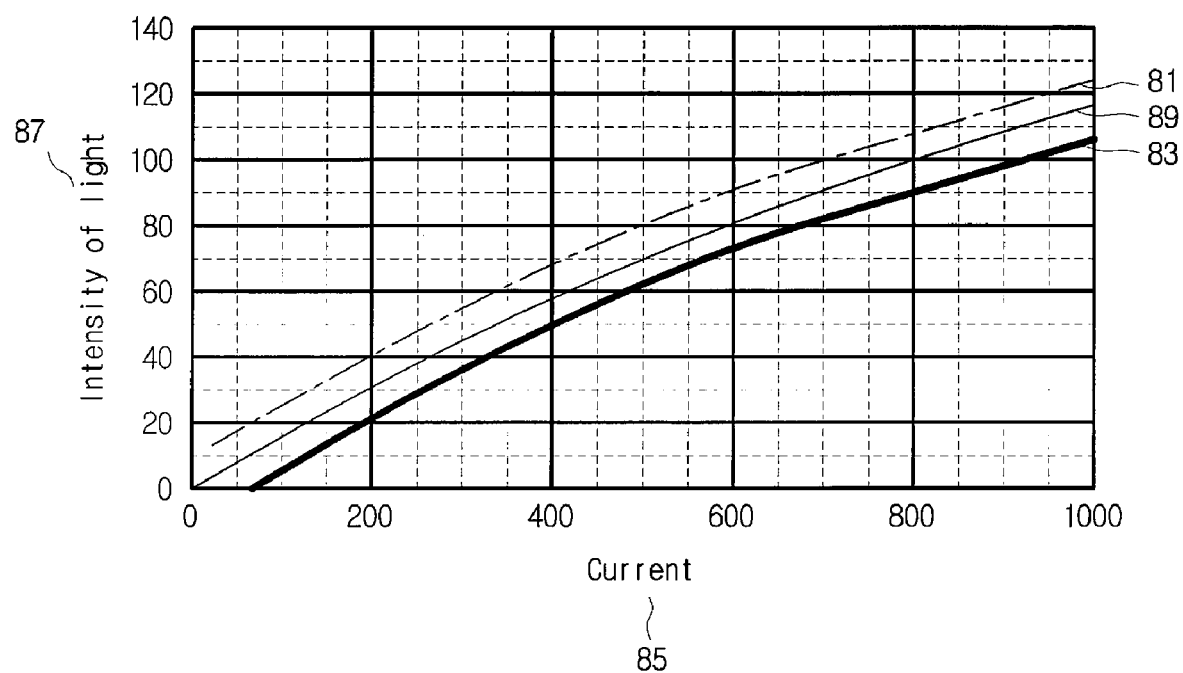
FIG. 8 shows a difference between electric current and the intensity of light generated according to an LED that is used in a camera flash in accordance with an embodiment of the present invention.

The LED deviation managing unit 127 of the camera control module 120 sets the LED deviation table in which deviation information corresponding to the LED is matched with an LED deviation value. Here, the deviation information refers to a difference between the LED used in the LED camera flash 173 and the basic LED. The reason why the LED deviation table is set is because each of the LEDs used in the LED camera flash 173 has it own different properties. That is, as shown in FIG. 8, a first LED 81 and a second LED 83 have different intensities of light 87, depending on the electric current 85. In one example, when the electric current is 600 mA, the intensities of the basic LED 89, the first LED 81 and the second LED 83 are 80 Lux, 90 Lux and 70 Lux, respectively. Thus, it is required that the LED deviation managing unit 127 set an LED deviation value that is to be corrected so as to obtain the same intensity of light.

For the convenience of description, the step of setting of the LED deviation table is performed after the step of extracting of the distance current value and the distance gain value, but the step of setting of the LED deviation table can be performed at the time of setting the mobile terminal 10 initially or updating the mobile terminal 10.

The LED deviation managing unit 127 of the camera control module 120 determines the deviation information of the LED used in the LED camera flash 173 (S460).

The camera control module 120 extracts the LED deviation value by using the deviation information of the LED (S470). That is, the LED deviation managing unit 127 of the camera control module 120 extracts an LED deviation value matched to the deviation information of the LED from the predetermined LED deviation table.

The camera control module 120 sets the gain correction value by using the distance current value, the distance gain value, the LED deviation value and the exposure gain value (S480). In other words, the correction setting unit 129 of the camera control module 120 can define the gain correction value as expressed in the following mathematical equation 1.

$$G_C = I_M + G_M \pm \Delta I_L - \Delta G_E \quad \text{[Mathematical Equation 1]}$$

Here, $G_C$ is a gain correction value, $I_M$ is a distance current value, $G_M$ is a distance gain value, $\Delta I_L$ is an LED deviation value, and $\Delta G_E$ is an exposure gain value.

The correction value setting unit 129 sets the gain correction value $G_C$ by applying the distance current value and the distance gain value, which are extracted from the extracting unit 125, to $I_M$ and $G_M$, respectively, applying the exposure gain value, which is set by the computing unit 121, to $\Delta I_L$, and applying the LED deviation value, which is extracted from the LED deviation managing unit 127, to $\Delta G_E$.

The camera control module 120 adjusts the brightness of the LED camera flash 173 by using the gain correction value (S490). Specifically, the driving control unit 131 of the camera control module 120 sets the driving current value by using the gain correction value. Meanwhile, the driving control unit 131 can set the driving gain value by using the gain correction value. The driving control unit 131 controls and adjusts the brightness of the LED camera flash 173 by providing the driving current value to the flash driving unit 175. The driving control unit 131 can also set basic brightness information regarding the brightness of the surrounding of the object where the LED camera flash 173 is to operate. Then, the driving control unit 131 does not provide the driving current value to the flash driving unit 175 so as not to operate the LED camera flash 173 if the surrounding brightness information exceeds the basic brightness information. The driving control unit 131 periodically provides the driving current value to the flash driving unit 175 at certain intervals so as to operate the LED camera flash 173 if the surrounding brightness information does not exceed the basic brightness information.

While the spirit of the present invention has been described in detail with reference to particular embodiments, the embodiments are for illustrative purposes only and shall not limit the present invention. It is to be appreciated that those skilled in the art can change or modify the embodiments without departing from the scope and spirit of the present invention.

What is claimed is:

1. A mobile terminal including an LED camera flash, the mobile terminal comprising:
   a lens for photographing an object;
   an image sensing unit configured to generate a sensor result value by executing automatic exposure and automatic white balance;
   a flash module including a flash driving unit that controls the LED camera flash;
   an actuator configured to move the lens and record a distance traveled by the lens; and
   a camera control module configured to set an exposure gain value by using the sensor result value, extract a distance current value and a distance gain value by using position information of the lens that is determined by using the distance traveled by the lens, and control the flash driving unit so as to adjust a brightness of the LED camera flash according to a gain correction value, which is set by using the exposure gain value, the distance current value and the distance gain value.

2. The mobile terminal of claim 1, wherein the camera control module further comprises:
   an LED deviation managing unit configured to determine deviation information of an LED used in the LED camera flash and extract an LED deviation value that is matched with the deviation information from a predetermined LED deviation table; and
   a correction value setting unit configured to set the gain correction value by using the exposure gain value, the distance current value, the distance gain value and the LED deviation value.

3. The mobile terminal of claim 1, wherein the camera control module further comprises:
   a computing unit configured to generate surrounding brightness information by removing the intensity of light of the LED from the sensor result value and set the exposure gain value by using the surrounding brightness information; and
   an extracting unit configured to set distance information regarding a distance to the object by using the position information of the lens and extract from a predetermined LED driving table the distance current value and the distance gain value that are matched with the distance information regarding the distance to the object.

4. The mobile terminal of claim 3, where the extracting unit is configured to set a lens movement table, in which the position information of the lens is matched with the distance information regarding the distance to the object, and extract from the lens movement table and set the distance information regarding the distance to the object matched with the position information of the lens.

5. The mobile terminal of claim 1, wherein the camera control module is configured to generate a brightness information table by matching surrounding brightness information to the sensor result value and extract from the brightness information table and set the surrounding brightness information matched to the sensor result value.

6. The mobile terminal of claim 1, wherein the camera control module further comprises a driving control unit configured to set a driving current value by using the gain correction value and control and drive the flash driving unit by using the driving current value.

7. The mobile terminal of claim 1, wherein the camera control module further comprises a focus managing unit configured to adjust and measure a focus of the lens, control the actuator so as to move the lens, control the actuator so as to move the lens to a corresponding position by determining a most optimal position of an image received from the image sensing unit, control the actuator so as to execute automatic focus, and determine the position information of the lens by using the distance traveled by the lens.

8. The mobile terminal of claim 1, wherein the camera control module further comprises a focus managing unit configured to control and move the lens, extract a maximum point at which a focus value measured according to the moving of the lens becomes a maximum, control the actuator so as to move the lens to the maximum point, control the actuator so as to execute automatic focus and determine the position information of the lens by using the distance traveled by the lens.

9. A method for controlling a camera flash, the camera flash being controlled by a mobile terminal including an LED camera flash, the method comprising:
   generating a sensor result value by executing automatic exposure and automatic white balance;
   setting an exposure gain value by using the sensor result value;
   determining position information of a lens by executing automatic focus;

extracting a distance current value and a distance gain value by using the position information of the lens;

setting a gain correction value by using the exposure gain value, the distance current value and the distance gain value; and adjusting a brightness of the LED camera flash according to the gain correction value.

10. The method of claim 9, wherein the setting of a gain correction value further comprises:

determining deviation information of an LED used in the LED camera flash;

extracting an LED deviation value matched with the deviation information from a predetermined LED deviation table; and setting a gain correction value by using the exposure gain value, the distance current value, the distance gain value and the LED deviation value.

11. The method of claim 10, further comprising, prior to the setting of a gain correction value, setting the LED deviation table in which the LED deviation information is matched with the LED deviation value.

12. The method of claim 10, wherein the setting of an exposure gain value comprises:

setting surrounding brightness information by removing the intensity of light of the LED from the sensor result value; and setting the exposure gain value by using the surrounding brightness information.

13. The method of claim 10, wherein the extracting of a distance current value and a distance gain value comprises:

setting distance information regarding a distance to an object by using the position information of the lens; and extracting from a predetermined LED driving table the distance current value and the distance gain value that are matched to the distance information regarding a distance to the object.

14. The method of claim 13, further comprising, prior to the extracting of a distance current value and a distance gain value, setting the LED driving table in which the distance current value and the distance gain value are matched to the distance information regarding a distance to the object.

* * * * *